(12) United States Patent
Ohashi et al.

(10) Patent No.: US 7,382,150 B2
(45) Date of Patent: Jun. 3, 2008

(54) SENSITIVITY SWITCHABLE DETECTION CIRCUIT AND METHOD

(75) Inventors: Yutaka Ohashi, Handa (JP); Jirou Hayashi, Ama-gun (JP)

(73) Assignee: Denso Corporation, Kariya, Aichi-pref. (JP)

( * ) Notice: Subject to any disclaimer, the term of this patent is extended or adjusted under 35 U.S.C. 154(b) by 307 days.

(21) Appl. No.: 11/326,344

(22) Filed: Jan. 6, 2006

(65) Prior Publication Data

US 2006/0238253 A1   Oct. 26, 2006

(30) Foreign Application Priority Data

Mar. 22, 2005   (JP)   ............... 2005-082158

(51) Int. Cl.
*G01R 31/34* (2006.01)
*B62D 5/04* (2006.01)
*G05F 5/00* (2006.01)

(52) U.S. Cl. .................. 324/772; 180/443; 323/299
(58) Field of Classification Search ............... None
See application file for complete search history.

(56) References Cited

U.S. PATENT DOCUMENTS

| | | | |
|---|---|---|---|
| 5,913,913 A * | 6/1999 | Okanoue et al. | 180/446 |
| 6,029,767 A | 2/2000 | Kifuku | |
| 6,140,928 A * | 10/2000 | Shibuya et al. | 324/426 |
| 6,272,410 B2 * | 8/2001 | Okanoue et al. | 180/446 |
| 6,397,969 B1 * | 6/2002 | Kasai et al. | 180/446 |
| 6,497,303 B1 | 12/2002 | Nishimura et al. | |
| 6,577,030 B2 | 6/2003 | Tominaga et al. | |
| 6,615,152 B2 | 9/2003 | Fujimoto et al. | |
| 7,183,757 B2 * | 2/2007 | Nagai | 323/285 |
| 7,315,159 B2 * | 1/2008 | Nagai | 323/283 |
| 2001/0002631 A1 * | 6/2001 | Okanoue et al. | 180/446 |
| 2006/0091872 A1 * | 5/2006 | Matsuura | 323/283 |
| 2007/0085521 A1 * | 4/2007 | Nagai | 323/283 |

FOREIGN PATENT DOCUMENTS

| | | |
|---|---|---|
| JP | 2001-158366 | 6/2001 |
| JP | 2001-171538 | 6/2001 |
| JP | 2001-278090 | 10/2001 |
| JP | 2003-2222 | 1/2003 |

* cited by examiner

*Primary Examiner*—Jermele Hollington
(74) *Attorney, Agent, or Firm*—Nixon & Vanderhye P.C.

(57) ABSTRACT

A sensitivity switchable detection circuit includes a high gain circuit for outputting a first signal, a low gain circuit for outputting a second signal, and an output switching circuit for switching between the first signal and the second signal. When the first signal is smaller than a lower limit, the first signal determines a detected signal. When the second signal is larger than an upper limit, the second signal determines the detected signal. When the first signal is larger than the lower limit and the second signal is lower than the upper limit, a weighting function that uses the first signal and the second signal as input variables determines the detected signal.

10 Claims, 2 Drawing Sheets

SENSITIVITY SWITCHABLE DETECTION CIRCUIT AND METHOD

CROSS REFERENCE TO RELATED APPLICATION

This application is based on and incorporates herein by reference Japanese Patent Application No. 2005-82158 filed on Mar. 22, 2005.

FIELD OF THE INVENTION

The present invention relates to a sensitivity switchable detection circuit and method.

BACKGROUND OF THE INVENTION

Motor control apparatuses, for example, electric power steering (EPS) apparatus disclosed in U.S. Pat. No. 6,497,303 (JP-A-2002-12157) or JP-A-2003-2222 uses feedback control to make a motor current converge to a desired current value (i.e., torque command). In a small current range such that the desired value is small, the feedback control is generally required to produce the motor current precisely in accordance with a small change in the desired value. In contrast, in a large current range such that the desired value is large, the feedback control may not be required to produce the motor current precisely in accordance with the small change in the desired value, because the absolute amount of a motor torque produced in the range is large.

Based on this requirement, a current detection circuit having switchable sensitivity has been proposed. The sensitivity switchable detection circuit detects a current with high accuracy in the small current range and with relatively low accuracy in the large current range, thus having a wide dynamic range. The sensitivity switchable detection circuit allows a current detection apparatus having high accuracy to be provided at low cost. Further, the sensitivity switchable detection circuit allows a communication bit rate between the sensitivity switchable detection apparatus and a signal processing device (e.g., microcomputer) to be reduced, thereby simplifying the signal processing operation performed by the signal processing device.

The sensitivity switchable detection circuit can be modified to detect various input quantities including the motor current and has advantage in terms of cost performance.

The sensitivity switchable detection circuit has a high gain region where a high amplification of an input quantity (e.g., electric current) is performed and a low gain region where a low amplification of the input quantity is performed. When the input quantity is small, the detection circuit uses the high gain region. In contrast, when the input quantity is large, the detection circuit uses the low gain region.

However, when the two gain regions are switched, a considerable change in a detected signal occurs between before and after the region switching operation, due to gain errors of amplifiers, circuit errors, or the like. Specifically, the detected signal shows step changes, i.e., sudden changes, even when the input quantity varies only a little between before and after the region switching operation.

If an output signal of a motor control apparatus suddenly changes, a motor torque suddenly changes. In the EPS control, the sudden change of the motor torque causes uncomfortable feelings in steering, for example.

Taking measures such as reducing differences in manufacturing tolerances and temperature variations between the high gain region and the low gain region of the detection circuit may prevent the above problem. However, such measures cause a reduction in yield and an increase in parts cost of the detection circuit, and therefore are not practical in most applications.

SUMMARY OF THE INVENTION

In view of the above-described problem, it is an object of the present invention to provide a sensitivity switchable detection circuit and method for reducing a sudden change in a detected signal, the sudden change occurring during a gain switching operation performed based on amplitude of an input signal.

A sensitivity switchable detection circuit includes a first detection circuit, a second detection circuit, and an output switching circuit. The first detection circuit has a first gain with respect to an input quantity and outputs a first signal proportional to the first gain. The second detection circuit has a second gain with respect to the input quantity and outputs a second signal proportional to the second gain. The output switching circuit switches between the first signal and the second signal based on their amplitudes and outputs a detected signal associated with the input quantity, thereby narrowing dynamic range of the detected signal. The first gain and the second gain are defined as the ratio of the amplitudes of the first signal and the second signal to the input quantity, respectively. The first gain is set higher than the second gain.

The output switching circuit has a high gain region, a low gain region, and a middle gain region as a signal transition region.

When the first signal is smaller than a lower limit, the output switching circuit is switched to the high gain region where only the first signal is selected for determining the detected signal. When the second signal is larger than an upper limit, the output switching circuit is switched to the low gain region where only the second signal is selected for determining the detected signal. When the first signal is larger than the lower limit and the second signal is smaller than the upper limit, the output switching circuit is switched to the middle gain region where a weighting function that uses the first signal and the second signal as input variables determines the detected signal. In the middle gain region, therefore, the detected signal has a value including both a first influence exerted by the first signal and a second influence exerted by the second signal.

Specifically, the gain region switching operation between the high gain region and the low gain region is achieved through the middle gain region. In the middle gain region, the sensitivity switchable detection circuit continuously or gradually changes the degrees of the first influence and the second influence. Thus, the current switching operation between the first signal and the second signal is achieved gradually, not suddenly.

This approach prevents the sudden change in the detected signal during the gain region switching operation, even if the first detection circuit or the second detection circuit has gain errors. Further, the gradual gain region switching operation can be achieved by processing the first signal and the second signal by means of simple hardware or software. Therefore, the sensitivity switchable detection circuit can be manufactured without an increase in manufacturing cost and has much practical application.

BRIEF DESCRIPTION OF THE DRAWINGS

The above and other objectives, features and advantages of the present invention will become more apparent from the following detailed description made with reference to the accompanying drawings. In the drawings.

DETAILED DESCRIPTION OF THE PREFERRED EMBODIMENT

Figure 1:
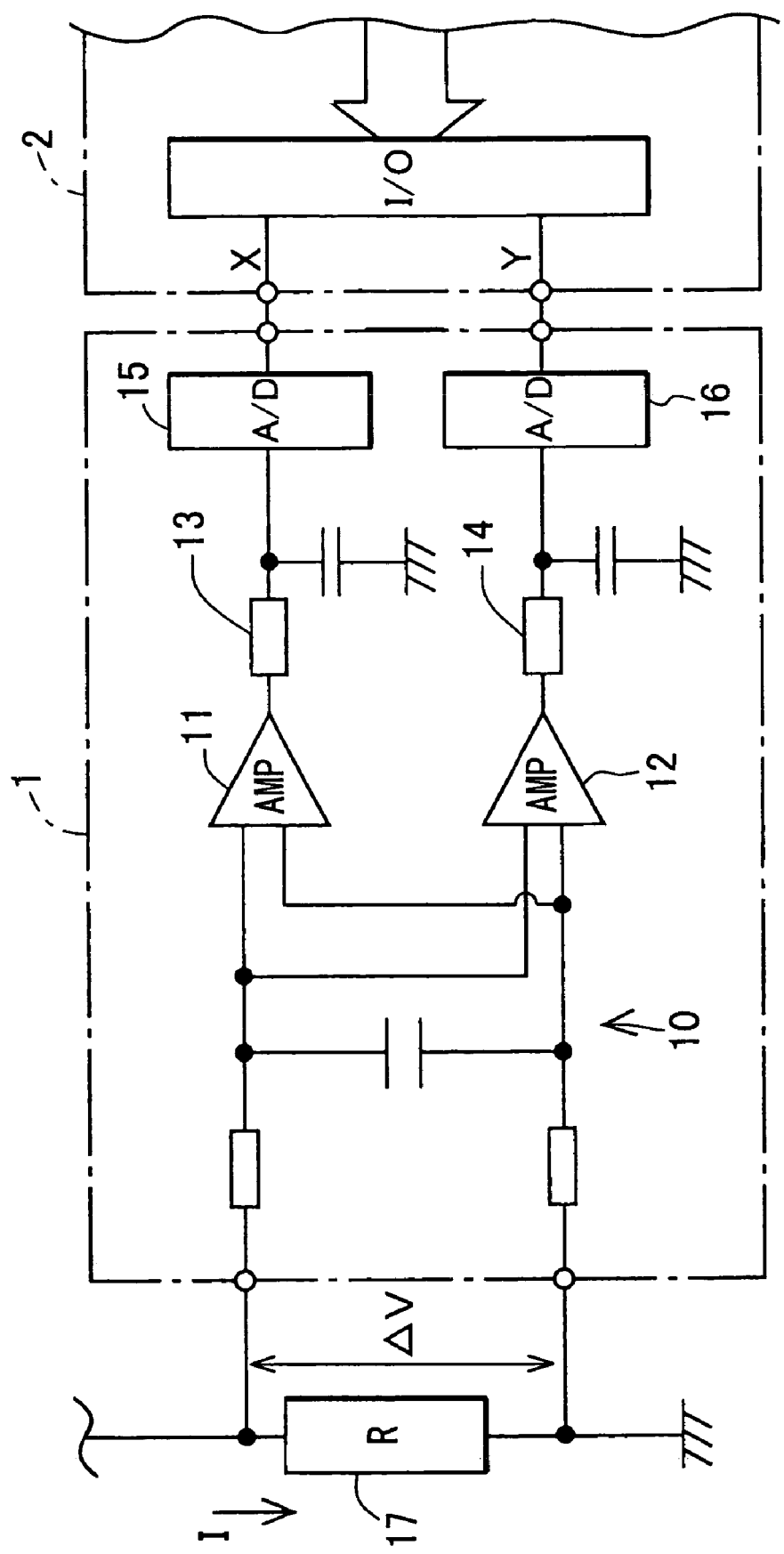
FIG. 1 is a circuit diagram of a sensitivity switchable detection circuit according to an embodiment of the present invention.

Reference is made to FIG. 1, which shows a circuit diagram of a sensitivity switchable detection circuit applied to a microcomputer 2 for controlling an actuator (not shown). A current detection circuit 1 is connected to a shunt resistor 17 having a resistance R to detect an input current I as an input quantity. The current detection circuit 1 converts a voltage ΔV appearing across the shunt resistor 17 to a digital signal and outputs the digital signal to an input/output (I/O) interface of the microcomputer 2. The microcomputer 2 functions as a control device for controlling steering assist torque. The microcomputer 2 controls an electric current of a motor as an actuator in such a manner the electric current changes in proportion to a steering force so that the motor produces a steering assist torque proportional to the steering force.

The current detection circuit 1 includes a RC low-pass filter 10 for extracting a low frequency component from the voltage ΔV, a first amplifier 11 having a first voltage gain G1 for amplifying a voltage outputted from the low-pass filter 10, a second amplifier 12 having a second voltage gain G2 for amplifying the voltage outputted from the low-pass filter 10, a resistor-capacitor (RC) low-pass filter 13 for extracting a low frequency component from a voltage outputted from the first amplifier 11, a RC low-pass filter 14 for extracting a low frequency component from a voltage outputted from the second amplifier 12, an analog-to-digital (A/D) converter 15 for converting the voltage outputted from the low-pass filter 13 to a digital signal, and an A/D converter 16 for converting the voltage outputted from the low-pass filter 14 to a digital signal. For example, the first gain G1 is set to 92, and the second gain G2 is set to 20.

The A/D converters 15, 16 output a first current X (first signal X) and a second current Y (second signal Y) as an 8-bit digital signal to an input-output interface (I/O) of the microcomputer 2, respectively. The microcomputer 2 determines a detected current Z (detected signal Z) based on the first current X and the second current Y. The detected current Z is represented by a number g bits, for example 12 bits, which is larger than those (8 bits) of the first current X and the second current Y.

When the first current X is smaller than a lower limit iL, the microcomputer 2 is switched to a high gain region where only the first current X is selected for determining the detected current Z. When the second current Y is larger than or equal to an upper limit iH, the microcomputer 2 is switched to a low gain region where only the second current Y is selected for determining the detected current Z. When the first current X is larger than or equal to the lower limit iL and the second current Y is smaller than the upper limit iH, the microcomputer 2 is switched to a middle gain region where both the first current X and the second current Y are selected for determining the detected current Z. In other words, the lower limit iL is a threshold value of the first current X and represents a border between the high gain region and the middle gain region. Likewise, the upper limit iH is a threshold value of the second current Y and represents a border between the low gain region and the middle gain region.

Figure 3:
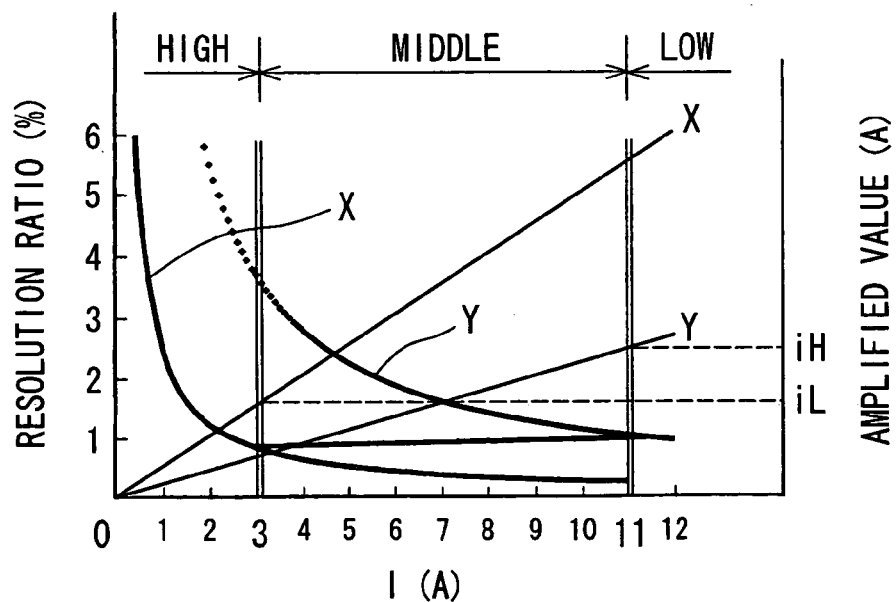
FIG. 3 is a graph illustrating relationships between a resolution ratio and the input current, and between lower and upper limits and the input current.

FIG. 3 shows an example of the lower limit iL and the upper limit iH. In the example, the input current I of 3 amperes corresponds to the lower limit iL and the input current I of 11 amperes corresponds to the upper limit iH.

Figure 2:
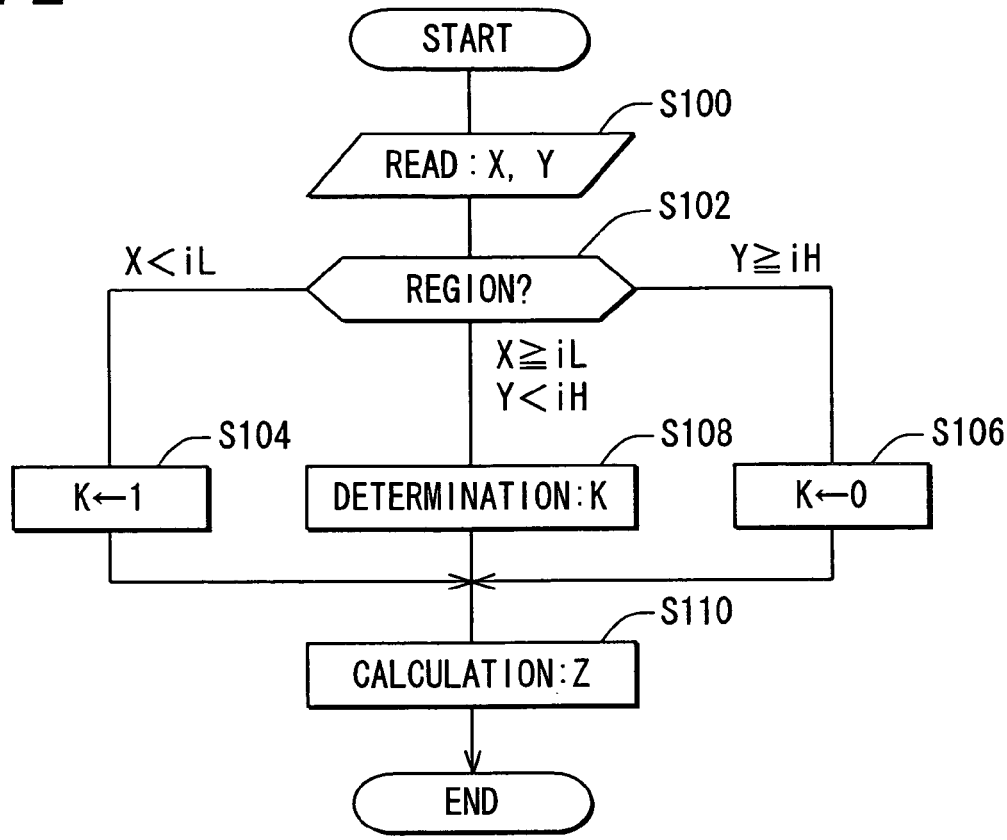
FIG. 2 is a flow diagram illustrating steps performed by a microcomputer shown in FIG. 1 for determining a detected current as an input current.

A current detection process performed at every time interval by the microcomputer 2 is described below with reference to a flow diagram shown in FIG. 2.

The process starts and proceeds to step S100, where the microprocessor 2 reads the first current X and the second current Y. Then, the process proceeds to step S102, where it is determined whether the first current X is smaller than the lower limit iL (X<iL) and whether the second current Y is larger than or equal to the upper limit iH (Y≧iH).

If the first current X is smaller than the lower limit iL, the process proceeds to step S104, where a weighting factor K is set to 1 in order that only the first current X is selected for determining the detected current Z. If the second current Y is larger than or equal to the upper limit iH, the process proceeds to step S106, where the weighting factor K is set to 0 in order that the second current Y is selected for determining the detected current Z. If the first current X is larger than or equal to the lower limit iL and the second current Y is smaller than the upper limit iH, the process proceeds to step S108. At step S108, the second current Y is checked against a prestored map that shows a correspondence between the second current Y and the weighting factor K so that the weighting factor K is determined to be variable with the second current Y After the weighting factor K is determined at step S104, step S106, or step S108, the process proceeds to step S110. At step S110, the detected current Z is calculated by substituting the first current X, the second current Y, and the weighting factor K into the following equation:

$$Z = \frac{K \cdot X}{G1} + \frac{(1-K)Y}{G2}$$

Then, the process ends.

At step S108, the weighting factor K may be determined by the first current X, instead of the second current Y At step S108, the weighting factor K may be determined by a predetermined function that uses the first current X and the second current Y as input variables.

In the correspondence map between the second current Y and the weighting factor K, when the first current X is close to the lower limit iL, the weighting factor K may have a value close to 1, for example between 0.9 and 1. This approach may prevent the sudden change in the detected current Z, when transition between the high gain region and the middle gain region occurs. Likewise, in the correspondence map, when the second current Y is close to the upper limit iH, the weighting factor K may have a value close to 0, for example between 0 and 0.1. This approach may prevent the sudden change in the detected current Z, when transition between the low gain region and the middle gain region occurs. Further, the correspondence map may allow a combined sensitivity in the middle gain region to change continuously as shown in FIG. 3 that illustrates a relationship between resolution ratio and the amplitude of the input current 1. The resolution ratio is a ratio of the amplitude of the input current I per 1 least significant bit (LSB) to the amplitude of the input current 1.

The current detection circuit 1 transmits the first current X and the second current Y to the microcomputer 2 in parallel, thereby increasing the dynamic range of the detected current Z without increasing the communication bit rate between the detection circuit 1 and the microcomputer 2. Further, the microcomputer 2 gradually switches between the first current X and the second current Y using the middle gain region, thereby preventing the sudden change in the detected current Z. Therefore, the sensitivity switchable detection circuit has much practical application.

The above embodiment may be modified in various ways. For example, the following equation may be used at step S110 shown in FIG. 2, if a value Z·G2, which is a product of the detected current Z and the gain G2, is used in a subsequent process:

$$Z \cdot G2 = \frac{K \cdot X \cdot G2}{G1} + (1-K)Y$$

In this case, the value G2/G1, which is a quotient of the gain G2 divided by the gain G1, may be prestored for eliminating a time-consuming division process. Further, the gains G1, G2 are set in such a manner the value G2/G1 results in an integer or a simple decimal number. In such approaches, the calculation process may be simplified.

The lower limit iL may be the threshold value of the second current Y and the upper limit iH may be the threshold value of the first current X. In other words, the high gain region may be used when the second current Y is smaller than the lower limit iL, the low gain region may be used when the first current X is larger than the upper limit iH, and the middle gain region may be used when the second current Y is larger than the lower limit iL and the first current X is smaller than the upper limit iH.

Such changes and modifications are to be understood as being within the scope of the present invention as defined by the appended claims.

What is claimed is:

1. A sensitivity switchable detection circuit, comprising:
a first detection circuit having a first gain with respect to an input quantity, the first detection circuit outputting a first signal proportional to the input quantity;
a second detection circuit having a second gain with respect to the input quantity, the second detection circuit outputting a second signal proportional to the input quantity; and
an output switching circuit that outputs a detected signal associated with the input quantity by switching between the first signal and the second signal based on amplitudes thereof, thereby narrowing dynamic range of the detected signal, wherein
the first gain defined as a ratio of the amplitude of the first signal to the input quantity is set higher than the second gain defined as a ratio of the amplitude of the second signal to the input quantity,
the output switching circuit has a high gain region where only the first signal is selected for outputting the detected signal, a low gain region where only the second signal is selected for outputting the detected signal, and a middle gain region where a weighting function having a weighting factor outputs the detected signal by using both the first signal and the second signal as input variables so that the detected signal varies as a function of both the first signal and the second signal, and the output switching circuit uses the high gain region when the first signal or the second signal is smaller than a predetermined lower limit, the low gain region when the first signal or the second signal is larger than a predetermined upper limit, and the middle gain region when the first signal or the second signal is larger than the predetermined lower limit and smaller than the predetermined upper limit.

2. The circuit according to claim 1, wherein
the weighting factor is set to give more weight to the second signal than to the first signal continuously or gradually in calculating the detected signal as the input quantity increases.

3. The circuit according to claim 2, wherein
the weighting function is represented by the following equation:

$$\frac{K \cdot X}{G1} + \frac{(1-K) \cdot Y}{G2},$$

wherein
K is the weighting factor, X is the first signal, Y is the second signal, G1 is the first gain, and G2 is the second gain, wherein
the weighting factor has a value between 0 and 1, the value increasing in accordance with the increases in the first signal and the second signal.

4. The circuit according to claim 3, wherein
the weighting factor continuously changes in accordance with the second signal.

5. The circuit according to claim 3, wherein
the weighting factor is close to 1 when the first current is close to the predetermined lower limit, and close to 0 when the second current is close to the predetermined upper limit.

6. The circuit according to claim 1, wherein
the output switching circuit is a microcomputer having a first input port for receiving the first signal, a second input port for receiving the second signal, and a stored program for outputting the detected signal based on the first signal and the second signal.

7. A sensitivity switching input quantity detection method, comprising:
generating an input value variable with a detected physical parameter;
amplifying the input value with a first gain and a second gain smaller than the first gain to produce a first amplified value and a second amplified value, respectively;
setting a weighting factor variably with the input value;
calculating a third value as a function of both the first value and the second value by using the weighting factor; and
outputting, as a detection value of the physical parameter, the first value when the first value is smaller than a predetermined lower limit, the second value when the second value is larger than a predetermined higher limit, and the third value when the first value is larger than the predetermined lower limit and the second value is smaller than the predetermined higher limit.

8. The method according to claim 7, wherein the weighting factor is set to vary between 0 and 1 in a range of the predetermined lower limit and the predetermined higher limit.

9. The method according to claim 7, wherein the weighting factor is set to give more weight to the second value than to the first value in calculating the third value as the input value increases.

10. The method according to claim 7, wherein the third value is calculated as $$\frac{K \cdot X}{G1} + \frac{(1-K) \cdot Y}{G2},$$

with K being the weighting factor, X being the first value, Y being the second value, G1 being the first gain, and G2 being the second gain.

* * * * *